US00RE36172E

United States Patent [19]

Kobussen et al.

[11] E Patent Number: Re. 36,172

[45] Reissued Date of Patent: Mar. 30, 1999

[54] METHOD OF LINKING A STRAND OF UNCASED COEXTRUDED MEAT EMULSION PRODUCT

[75] Inventors: Jos Kobussen; Mart Kobussen, both of Indianola, Iowa; Jaap Kobussen, La Veghel, Netherlands

[73] Assignee: Townsend Engineering Company, Des Moines, Iowa

[21] Appl. No.: 745,242

[22] Filed: Oct. 18, 1996

Related U.S. Patent Documents

Reissue of:

[64] Patent No.: 5,532,014
Issued: Jul. 2, 1996
Appl. No.: 515,674
Filed: Aug. 16, 1995

[51] Int. Cl.[6] ..... A22C 13/00

[52] U.S. Cl. ..... 426/513; 426/140; 426/646; 452/48

[58] Field of Search ..... 426/513, 129, 426/140, 646, 523; 452/48

[56] References Cited

U.S. PATENT DOCUMENTS

| | | | |
|---|---|---|---|
| 2,698,800 | 1/1955 | Rueckert | 452/48 |
| 2,698,801 | 1/1955 | Luce | 452/48 |
| 4,025,455 | 5/1977 | Shackle | 252/316 |
| 4,169,818 | 10/1979 | Demartino | 252/8.5 R |
| 4,172,055 | 10/1979 | Demartino | 252/8.5 R |
| 4,339,940 | 7/1982 | Mackay et al. | 29/243.56 |
| 4,352,232 | 10/1982 | Winders et al. | 29/243.56 |
| 4,401,329 | 8/1983 | Pedroia | 289/18.1 |
| 4,404,229 | 9/1983 | Treharne | 426/513 |
| 4,458,402 | 7/1984 | Evans et al. | 29/243.56 |
| 4,525,898 | 7/1985 | Gallion et al. | 24/543 |
| 5,053,239 | 10/1991 | Vanhatalo et al. | 426/513 |
| 5,204,121 | 4/1993 | Bucheler et al. | 424/495 |
| 5,221,228 | 6/1993 | Pedroia | 452/48 |

FOREIGN PATENT DOCUMENTS

| | | | |
|---|---|---|---|
| 0296300 | 12/1988 | European Pat. Off. | 452/48 |
| WO 93/12600 | 7/1993 | WIPO . | |

*Primary Examiner*—George Yeung
*Attorney, Agent, or Firm*—Zarley, McKee, Thomte, Voorhees & Sease

[57] ABSTRACT

The method for linking a strand of an elongated coextruded meat emulsion product having an outer surface exposed to the atmosphere without the benefit of an enclosed casing comprises subjecting the strand to a constrictive force at spaced intervals along its length to create a plurality of link points of reduced diameter along the length of the strand. The link points are surrounded by an edible linking material capable of holding the link points in a condition of reduced diameter during a cooking cycle at a temperature in excess of 60° C. After cooking, the link strand is then subjected to a water based rinse at a temperature of less than 60° C. wherein the linked material will dissolve and will be removed from the strand. The preferred linking material is one from a group of hydroxypropylcellulose and methylhydroxyproplycellulose.

20 Claims, 1 Drawing Sheet

METHOD OF LINKING A STRAND OF UNCASED COEXTRUDED MEAT EMULSION PRODUCT

Matter enclosed in heavy brackets [ ] appears in the original patent but forms no part of this reissue specification; matter printed in italics indicates the additions made by reissue.

BACKGROUND OF THE INVENTION

Sausage products and the like historically are typically extruded into a hollow continuous casing. The filled casings are then linked by mechanical means by twisting, wherein the filled casing is divided into a plurality of links separated by spaced twisted link points. The encased product is then cooked, and the casing material is then removed.

In more recent times, the meat emulsion is coextruded without a casing to have a thin layer of a hardenable coating substance on the outer surface thereof, which, when cured, creates a hardened coating to take the place of the casing material used in the conventional process. However, the sausage strand created by this coextrusion process is not durable enough to be linked by conventional mechanical linkers. There are string tying and clip machines available to create links in conventional encased sausage strands, but these devices require the string or clips to be removed, which adds expense and time to the process.

It is therefore a principal object of this invention to provide a method of linking a strand of uncased coextruded meat emulsion which will not damage the structural integrity of the extruded strand.

A further object of this invention is to provide a method of linking a strand of uncased coextruded meat emulsion wherein an edible material is used at link points on the extruded strand to create links in the strand.

A still further object of this invention is to provide a method of linking a strand of uncased coextruded meat emulsion wherein the linking material is structurally sufficient to constrict the extruded strand at link points, at elevated temperatures during a cooking cycle, but which can be removed by rinsing in water at reduced temperatures.

These and other objects will be apparent to those skilled in the art.

SUMMARY OF THE INVENTION

The method for linking a strand of an elongated coextruded meat emulsion product having an outer surface exposed to the atmosphere without the benefit of an enclosed casing comprises subjecting the strand to a constrictive force at spaced intervals along its length to create a plurality of link points of reduced diameter along the length of the strand. The link points are surrounded by an edible linking material capable of holding the link points in a condition of reduced diameter during a cooking cycle at a temperature in excess of 60° C. After cooking, the link strand is then subjected to a water based rinse at a temperature of less than 60° C. wherein the linked material will dissolve and will be removed from the strand. The preferred linking material is one from a group of hydroxypropylcellulose and methylhydroxyproplycellulose.

DESCRIPTION OF THE PREFERRED EMBODIMENT

Figure 1:
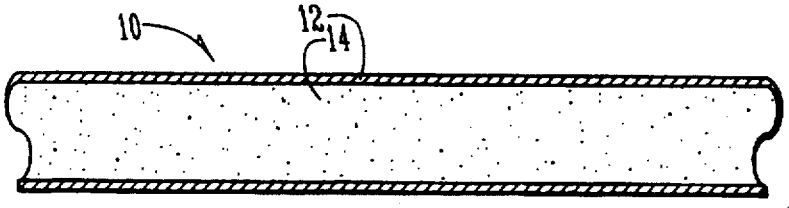
FIG. 1 is a side elevational view of an elongated coextruded food emulsion product.
Figure 2:
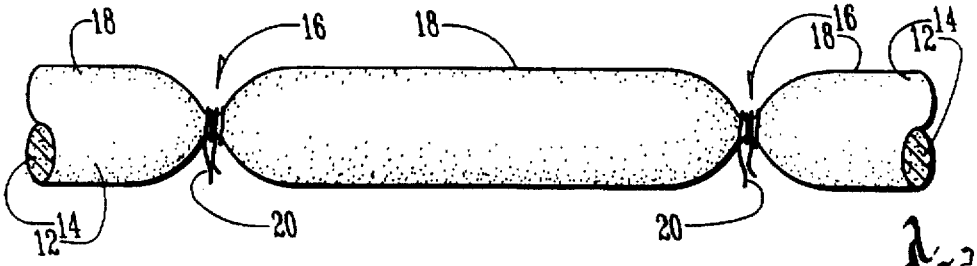
FIG. 2 is an elevational view of the strand of FIG. 1 wherein the strand is constricted at a plurality of link points along its length by a string comprised of an edible linking material.

With reference to FIG. 1, a coextruded strand of meat emulsion 10 is shown which is comprised of a core material 12 of meat emulsion or the like, and a thin coating material 14. It is understood that references to meat emulsion or food emulsion are intended to include any type of edible product. The core emulsion material 12 may be comprised of emulsified meat or the like which is common in the manufacture of sausages, wieners, etc. The coating material 14 may consist of a mixture of gel with a coagulable protein and reinforcing means. The materials or core 12 and 14 are simultaneously extruded from a conventional coextruding horn or the like so that the strand 10 results therefrom. The coating 14 is a coagulated protein emulsion and is hardened by removal of water from the collagen gel, and by cross-linking the collagen fibers therein. A process for creating the core-extruded strand 10 is disclosed in International Patent Application WO93/12660. The strand 10 with the cured or hardened coating 14 thereon is generally not suitable for linking through a conventional mechanical linker. The strand 10 as shown in FIGS. 2 and 3 have a plurality of linked points 16 of reduced diameter which form a plurality of conventional links 18 of equal length.

Figure 3:
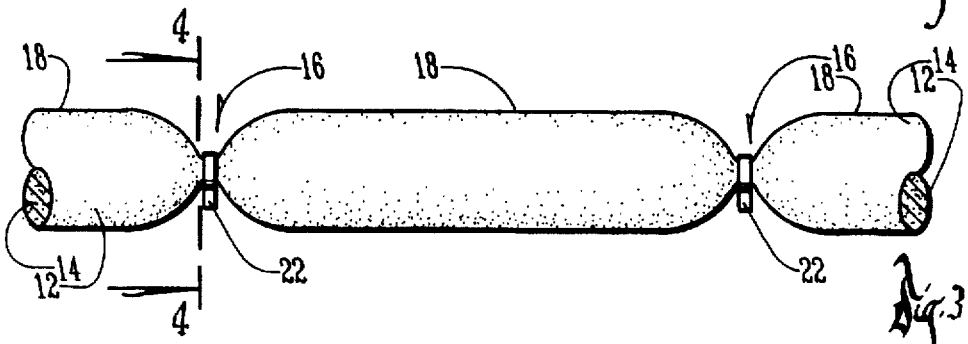
FIG. 3 is a view similar to that of FIG. 2 but wherein the link points are created by clips instead of string wherein the clips are comprised of an edible linking material.

FIG. 3 shows a length of string 20 surrounding the link points 18 and tied in place. Link tying machines are conventional in the art. See for example, U.S. Pat. Nos. 5,221,228 and 4,401,329.

Figure 4:
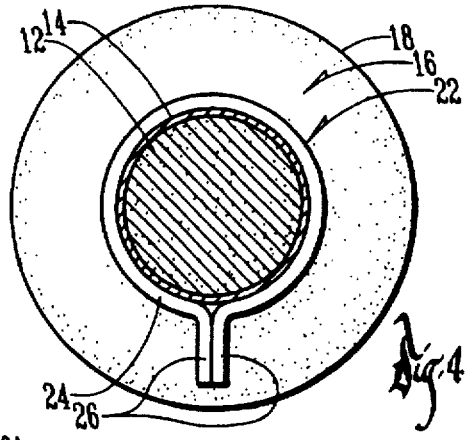
FIG. 4 is a sectional view taken on line 4—4 of FIG. 3.

FIG. 3 shows clips 22 at the link points 16. The application of clips to a sausage strand is also old in the art. For example, see U.S. Pat. Nos. 4,458,402 and 4,352,232. The clip 22 includes a loop portion 24 (FIG. 4) which has opposite ends terminating in tab portions 26 which are secured together. The loop portion 24 fits tightly around the girth of the strand 10 to create the link point 16. The link points 16 are preferably created by a constrictive force exerted on the strand at the locations of the link points when the strings 20 or clips 22 are applied to the strand.

It should be fully understood that the strand 10 described heretofore exists in the prior art. Similarly, the use of unedible strings and clips 22 are also used in the prior art for linking conventional encased sausages and the like.

The essence of this invention involves the method of linking the strand 10 with the use of a string or clip (20 and 22, respectively) comprised of an edible material which has substantial structural properties at a higher temperature levels, and which is soluble in water *or a water based solution* at lower temperatures. The preferred material for the string 20 or the clips 22, according to this invention is hydroxypropylcellulose (HPC) or methylhydroxyproplycellulose (MHPC). HPC is a white powder and is soluble in water, methyl and ethyl alcohol and other organic solvents. It is combustible, non-toxic, and thermal plastic in that it can be extruded and molded. It is insoluble in water warmer than approximately 60° C. It is typically used as a emulsifier, a film former, a protective colloid, a stabilizer, and a suspending agent or thickener, commonly used in food additives.

MHPC is also a white powder which swells in water producing a clear to opalescent, viscous, colloidal solution.

It is also insoluble in water warmer than approximately 60° C. MPHC is commonly used in medicine as a suspending agent; and in food products as a thickening agent, stabilizer, and emulsifier.

HPC is commercially produced by reacting alkali cellulose with propeline oxide at elevated temperatures and pressures. Methods of producing HPC are described in U.S. Pat. Nos. 2,572,039; 3,131,196; 3,485,915; 4,025,455, and references cited therein.

As indicated above, the string 20 and clips 22 are comprised of either the HPC or the MHPC material. They are applied to the extruded strand 10 either before or after the coating 14 is fully hardened or coagulated. They can be applied at any temperature. The alternate use of the string 20 or the clips 22 are applied at the link points 16 by the conventional devices of the prior art described heretofore. The string 20 or clips 22 can be in place during the curing or drying of the coating 14 and preferably through the smoking or cooking of the core material 12 wherein the temperature of the strand 10 and the string or clips is maintained at a temperature in excess of 60° C.

Figure 5:
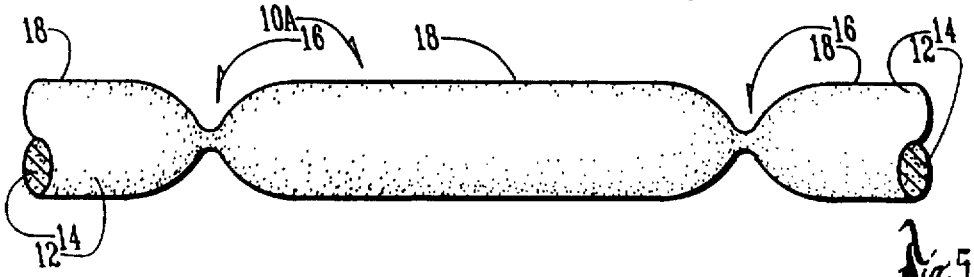
FIG. 5 is a view similar to that of FIGS. 2 and 3 but without linking material removed therefrom.

Thereafter, at any point of the cooking cycle when the protein of the layer 14 sets up (hardens), the link strand 10 can then be subjected to rinsing in water or a water based solution at a temperature of less than 60° C., whereupon the string or clips 20 will dissolve thus creating the linked strand 10A shown in FIG. 5. The hardened coating 14 of the strand 10A in FIG. 5 will maintain the shape and integrity of the links 18 after the string 20 or clips 22 are removed from the strand 10.

It has also been found that the string 20 or clip 22 have been useful in tying off the last links of a strand of conventionally linked encased sausages. This is because each time a conventional encasing process reaches the end of a conventional casing, there is not enough drag in the casing for the mechanical linker to make a complete link. Thus, the string 20 in clip 22 used at the end of a conventional encasing and linking process can be used to avoid having to strip the emulsion out of the last link or so, and manually tying a knot in the emptied casing.

It is therefore seen that this invention will achieve at least its stated objectives.

What is claimed is:

1. A method for linking a strand of an elongated coextruded food emulsion product having an outer surface exposed to the atmosphere without the benefit of an enclosed casing, and having a substantially uniform diameter, comprising, subjecting said strand to a constrictive force at spaced intervals along its length to create a plurality of link points of reduced diameter along said length, and surrounding said link points with an edible linking material capable of holding said link points in a condition of reduced diameter,

*wherein said linking material is water soluble at temperatures below 60° C.*

2. The method of claim 1 wherein said linking material is used to apply said constrictive force.

3. The method of claim 1 wherein [said linking material is water soluble at temperatures below 60°, and] said strand is subjected to a water based rinse to dissolve and remove said linking material from said strand.

4. The method of claim 1 wherein said strand is subjected to a cooking cycle after said linking material is applied to said link points.

5. The method of claim 1 wherein said linking material is one selected from the group consisting of hydroxypropylcellulose and [methylhydroxyproplycellulose] *methylhydroxypropylcellulose.*

6. A method of linking a strand of elongated food emulsion product having a substantially uniform diameter, comprising, subjecting said strand to a constrictive force at a link point thereon to create a reduced diameter of said strand, and surrounding said link point with an edible linking material capable of holding said link point in a condition of reduced diameter,

*wherein said linking material is water soluble at temperatures below 60° C.*

7. The method of claim 6 wherein said linking material is used to apply said constrictive force.

8. The method of claim 6 wherein [said linking material is water soluble at temperatures below 60°, and] said strand is subjected to a water based rinse thereafter to remove said linking material from said strand.

9. The method of claim 6 wherein said strand is subjected to a cooking cycle after said linking material is applied to said link point.

10. The method of claim 6 wherein said linking material is one selected from the group consisting of hydroxypropylcellulose and [methylhydroxyproplycellulose] *methylhydroxypropylcellulose.*

11. The method of claim 1 wherein said linking material is water soluble at temperatures below approximately 60° C., applying said linking material so that it will be present at said link points while said strand is subjected to a cooking temperature and thereafter rinsing said strand with a water based solution at a temperature less than approximately 60° C. to dissolve and remove said linking material.

12. A method for linking a strand of an elongated coextruded food emulsion product having a hardenable outer surface exposed to the atmosphere without the benefit of an enclosed casing, and having a substantially uniform diameter, comprising, subjecting said strand to a constrictive force at spaced intervals along its length to create a plurality of link points of reduced diameter along said length, surrounding said link points with a linking material capable of holding said link points in a condition of reduced diameter, said linking material being soluble in a water based solution at temperatures below approximately 60° C.;

cooking said strand and hardening said outer surface, and rinsing said strand thereafter in a water based solution having a temperature below approximately 60° C. to dissolve said linking material for removal thereof from said strand.

13. The method of claim 12 wherein said linking material is one selected from the group consisting of hydroxypropylcellulose and methylhydroxyproplycellulose.

14. The method for linking a strand of an elongated coextruded food emulsion product having an inner core emulsion material and an outer surface layer which can become chemically hardenable in the presence of air, subjecting said strand to a constrictive force at spaced intervals along its length to create a plurality of link points of reduced diameter along said length, surrounding said link points with a linking material capable of holding said link points in a condition of reduced diameter, said linking material being soluble in a water based solution at temperatures below approximately 60° C.;

allowing said strand to harden so that said strand will assume the configuration of said link points without the application of any constrictive force, and rinsing said strand thereafter in a water based solution having a temperature below approximately 60° C. to dissolve said linking material for removal thereof from said strand.

15. The method of claim 14 wherein said linking material is one selected from the group consisting of hydroxypropylcellulose and methylhydroxproplycellulose.

16. The method of claim 1 wherein said linking material dissolves in a water based solution.

17. The method for linking a strand of an elongated coextruded food emulsion product having an inner core emulsion material and an outer surface layer which can become chemically hardenable in the presence of air.

subjecting said strand to a constrictive force at spaced intervals along its length to create a plurality of link points of reduced diameter along said length, and surrounding said link points with a linking material to hold said link points in a condition of reduced diameter.

said linking material being of a material that is soluble in a water based solution having a temperature less than approximately 60° C..

and rinsing said strand thereafter in a water based solution having a temperature below approximately 60° C. to dissolve said linking material for removal thereof from said strand.

*18. A method of linking a strand of elongated food emulsion product having a substantially uniform diameter, comprising,*

*subjecting said strand to a constrictive force at a link point thereon to create a reduced diameter of said strand, and*

*surrounding said link point with a linking material capable of holding said link point in a condition of reduced diameter,*

*said linking material being water soluble at temperatures below approximately 60° C.*

*19. A method of linking a strand of elongated food emulsion product having a substantially uniform diameter, comprising,*

*subjecting said strand to a constrictive force at a link point thereon to create a reduced diameter of said strand, and*

*surrounding said link point with a linking material capable of holding said link point in a condition of reduced diameter,*

*said linking material being capable of losing its structural integrity in the presence of a water based solution at a temperature of approximately less than 60° C. to release its hold on said link points.*

*20. A method for linking a strand of an elongated coextruded food emulsion product having an outer surface exposed to the atmosphere without the benefit of an enclosed casing, and having a substantially uniform diameter, comprising,*

*subjecting said strand to a constrictive force at spaced intervals along its length to create a plurality of link points of reduced diameter along said length, and*

*surrounding said link points with a linking material capable of holding said link points in a condition of reduced diameter,*

*said linking material being selected from the group consisting of hydroxypropylcellulose and methylhydroxypropylcellulose.*

* * * * *